US012681668B2

(12) United States Patent
Tiku et al.

(10) Patent No.: US 12,681,668 B2
(45) Date of Patent: Jul. 14, 2026

(54) MEMORY SUB-SYSTEMS WITH SEPARATE PATHS FOR APPLICATIONS TO ACCESS MEMORY CELLS

(71) Applicant: Micron Technology, Inc., Boise, ID (US)

(72) Inventors: Saideep Tiku, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/610,155

(22) Filed: Mar. 19, 2024

(65) Prior Publication Data

US 2024/0329883 A1     Oct. 3, 2024

Related U.S. Application Data

(60) Provisional application No. 63/493,501, filed on Mar. 31, 2023.

(51) Int. Cl.
G06F 3/06 (2006.01)
(52) U.S. Cl.
CPC ............ G06F 3/0659 (2013.01); G06F 3/061 (2013.01); G06F 3/0683 (2013.01)

(58) Field of Classification Search
CPC ...... G06F 3/061; G06F 3/0659; G06F 3/0679; G06F 3/0683
See application file for complete search history.

(56) References Cited

U.S. PATENT DOCUMENTS

| | | | | |
|---|---|---|---|---|
| 11,144,226 B2 * | 10/2021 | Yang | .......................... | G06F 3/061 |
| 2019/0199648 A1 * | 6/2019 | Chen | .................... | H04L 12/1881 |
| 2022/0209943 A1 * | 6/2022 | Syrivelis | ................ | G06N 10/00 |

* cited by examiner

*Primary Examiner* — Yong J Choe
(74) *Attorney, Agent, or Firm* — Greenberg Traurig

(57)     ABSTRACT

A memory sub-system operable to balance the performance goals of different types of applications. For example, first requests generated by a first type of applications running in a host system to access a storage medium of a memory sub-system can be identified and placed in a first queue. Second requests generated by a second type of applications running in the host system to access the storage medium of the memory sub-system can be identified and placed in a second queue. Servicing to the first queue and the second queue can be interleaved according to the performance requirement (e.g., based on throughput in storage access) of the first type of applications and the performance requirement (e.g., based on latency in storage access) of the second type of applications.

20 Claims, 8 Drawing Sheets

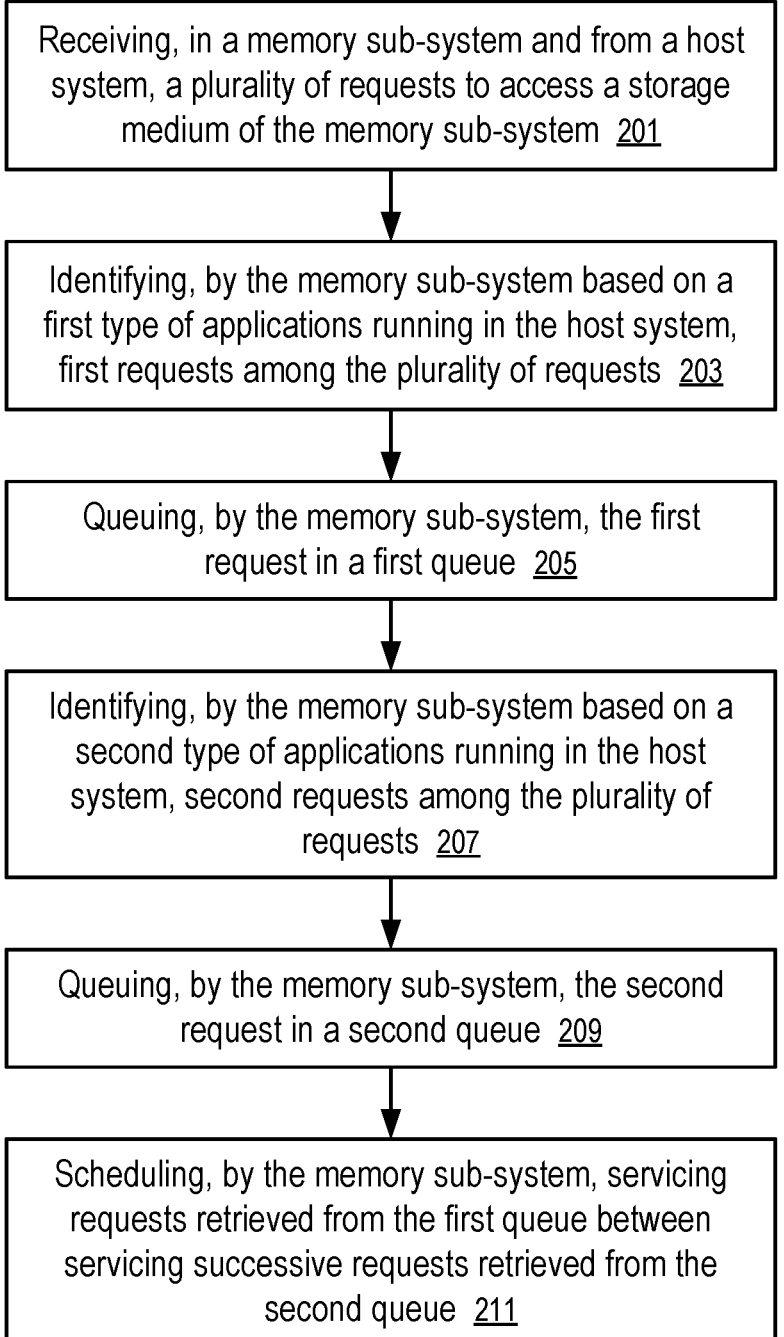

Receiving, in a memory sub-system and from a host system, a plurality of requests to access a storage medium of the memory sub-system 201

Identifying, by the memory sub-system based on a first type of applications running in the host system, first requests among the plurality of requests 203

Queuing, by the memory sub-system, the first request in a first queue 205

Identifying, by the memory sub-system based on a second type of applications running in the host system, second requests among the plurality of requests 207

Queuing, by the memory sub-system, the second request in a second queue 209

Scheduling, by the memory sub-system, servicing requests retrieved from the first queue between servicing successive requests retrieved from the second queue 211

FIG. 8

MEMORY SUB-SYSTEMS WITH SEPARATE PATHS FOR APPLICATIONS TO ACCESS MEMORY CELLS

RELATED APPLICATIONS

The present application claims priority to Prov. U.S. Pat. App. Ser. No. 63/493,501 filed Mar. 31, 2023, the entire disclosures of which application are hereby incorporated herein by reference.

TECHNICAL FIELD

At least some embodiments disclosed herein relate to memory systems in general, and more particularly, but not limited to data access traffic management within memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 8 shows a method of traffic management according to one embodiment.

DETAILED DESCRIPTION

Figure 1:
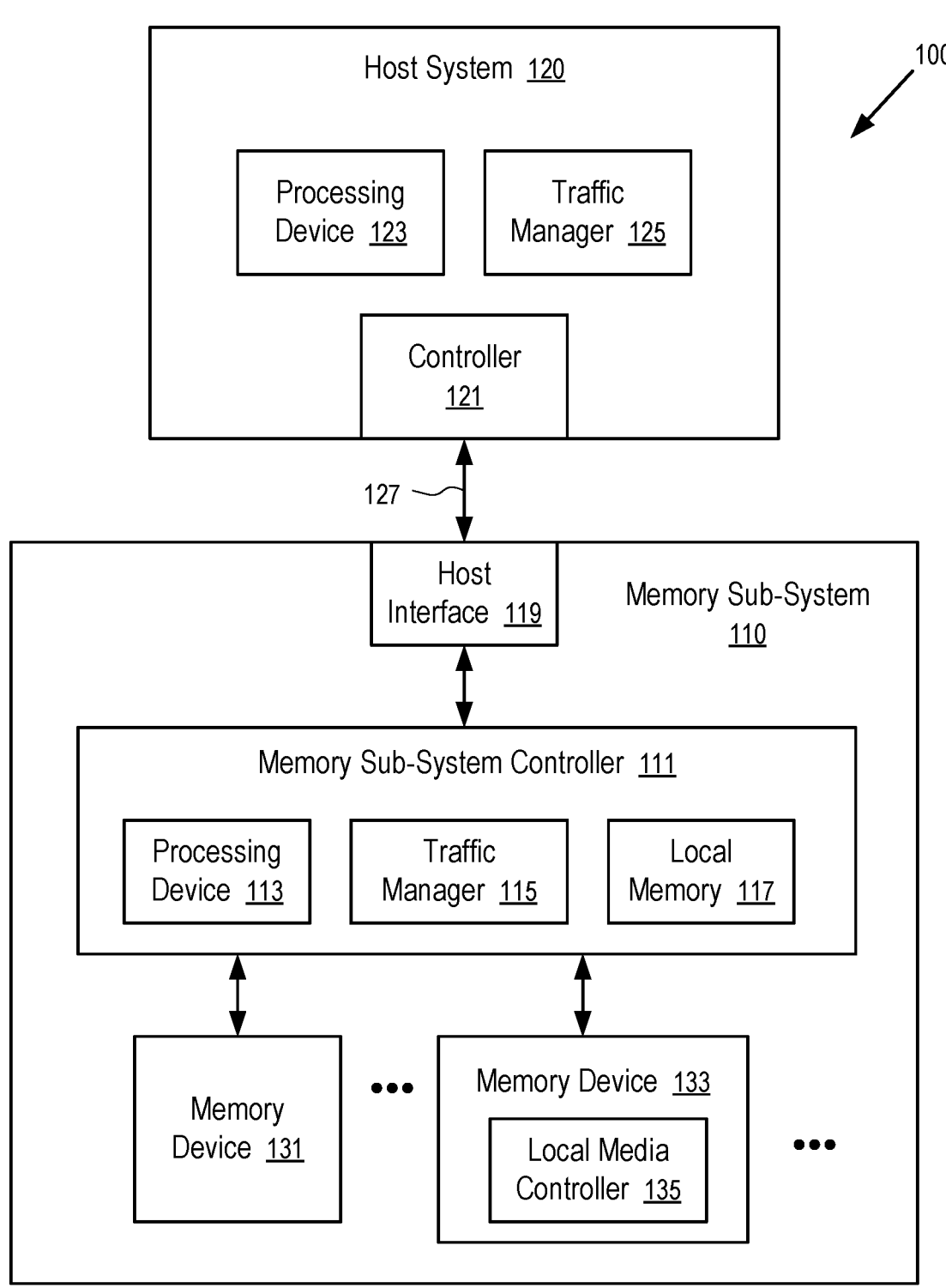
FIG. 1 illustrates an example computing system that includes a memory sub-system in accordance with some embodiments of the present disclosure.

At least some aspects of the present disclosure are directed to the provision of different paths for different types of applications to access a storage medium in the memory sub-system.

In general, a memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data; and the host system can provide data to be stored at the memory sub-system and can request data to be retrieved from the memory sub-system.

A memory sub-system can be connected to one or more host systems to provide memory services and/or data storage services. Multiple applications or threads running in the host systems can send access requests to the memory sub-system. Some applications can generate requests to access the memory sub-system with high frequencies in a period of time. When requests received in the memory sub-system are queued for processing according to the reception times of the requests, a request from an application can be queued after a large number of requests from applications that generate requests at high frequencies. As a result, the request of the application can be delayed for a long period of time due to the large number of requests queued before it, a condition referred to as head-of-line blocking.

At least some aspects of the present disclosure address the above and other deficiencies by deploying different access paths for different types of applications to alleviate head-of-line blocking.

For example, applications (e.g., processes or threads) running in host systems can be categorized based on their different performance requirements of a memory sub-system, such as a universal flash storage (UFS) device, a memory module, a storage device, or a hybrid of a storage device and memory module.

For example, an application of a type of throughput bound can have a computational workload that can be continuously scaled with the availability of resources for parallel processing. Thus, when sufficient resources are available, the latency bound application can generate a large number of access requests to the memory sub-system in a short period of time to reduce the time of completing the computational workload via parallel processing. The performance of the throughput bound application can be limited primarily by the throughput of the memory sub-system in processing its requests in a period of time as a whole. Examples of throughput bound applications include vision based deep learning workloads (e.g., for advanced driver assistance systems (ADAS)).

In contrast, an application of a type of latency bound cannot be scaled easily with the availability of resources for parallel processing. The performance level of the latency bound application can be limited primarily by the latency of the memory sub-system in processing its individual requests. Examples of latency bound applications include real-time media based applications.

If the requests of the latency bound application and the throughput bound application are placed in a same queue for processing, the requests from the latency bound application can be queued after a large number of requests from the throughput bound application. As a result, the performance level of the latency bound application can degrade severely due to the latency of the memory sub-system in processing queued requests and the head-of-line blocking by the requests from the throughput bound application.

To reduce impact of head-of-line blocking of requests from the latency bound application, blocked by the requests of the throughput bound application, separate paths can be provided for the processing of requests from applications of different types.

For example, when a request is received in the memory sub-system, the type of the application that causes the request can be identified to the memory sub-system (e.g., via vendor specific function pins). Thus, two queues can be configured in the memory sub-system for applications of the type of latency bound and for applications of the type of throughput bound respectively. The sizes of buffer memory allocated to the queues can be adjusted on the fly for improved performance.

A traffic manager can be configured in the memory sub-system to process the requests in the two queues according to a ratio. The traffic manager can be configured to control the traffic of moving data between the storage medium (e.g., NAND flash memory or another memory) and the local memory of the controller of the memory sub-system in servicing the requests in the queues.

For example, the traffic manager can be configured to service both queues completely fairly or adjust to serve a custom weightage between the two queues.

For example, the traffic manager can throttle the services to the throughput bound applications to keep the latency of servicing each request of latency bound applications below a threshold.

For example, the traffic manager can throttle the services to the latency bound applications to keep the average throughput of servicing requests of throughput bound applications above a threshold.

For example, the traffic manager can control the access traffic to optimize a combined performance indicator that is a function of the average throughput achieved for the requests in the queue for throughput bound applications and the average latency achieved for the requests in the queue for latency bound applications.

FIG. 1 illustrates an example computing system 100 that includes a memory sub-system 110 in accordance with some embodiments of the present disclosure. The memory sub-system 110 can include media, such as one or more volatile memory devices (e.g., memory device 131), one or more non-volatile memory devices (e.g., memory device 133), or a combination of such.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection 127 between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 123) and a software stack executed by the processor chipset. The processor chipset can include one or more cores, one or more caches, a memory controller (e.g., controller 121) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface 119. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI) interface, a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 133) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 123 of the host system 120 can be, for example, a microprocessor, a central processing unit (CPU), a processing core of a processor, an execution unit, etc. In some instances, the controller 121 can be referred to as a memory controller, a memory management unit, and/or an initiator. In one example, the controller 121 controls the communications over a bus coupled between the host system 120 and the memory sub-system 110. In general, the controller 121 can send commands or requests to the memory sub-system 110 for desired access to memory devices 131, 133. The controller 121 can further include interface circuitry to communicate with the memory sub-system 110. The interface circuitry can convert responses received from the memory sub-system 110 into information for the host system 120.

The controller 121 of the host system 120 can communicate with the controller 111 of the memory sub-system 110 to perform operations such as reading data, writing data, or erasing data at the memory devices 131, 133 and other such operations. In some instances, the controller 121 is integrated within the same package of the processing device 123. In other instances, the controller 121 is separate from the package of the processing device 123. The controller 121 and/or the processing device 123 can include hardware such as one or more integrated circuits (ICs) and/or discrete components, a buffer memory, a cache memory, or a combination thereof. The controller 121 and/or the processing device 123 can be a microcontroller, special-purpose logic circuitry (e.g., a field programmable gate array (FPGA), an application specific integrated circuit (ASIC), etc.), or another suitable processor.

The memory devices 131, 133 can include any combination of the different types of non-volatile memory components and/or volatile memory components. The volatile memory devices (e.g., memory device 131) can be, but are not limited to, random-access memory (RAM), such as dynamic random-access memory (DRAM) and synchronous dynamic random-access memory (SDRAM).

Some examples of non-volatile memory components include a negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 133 can include one or more arrays of memory cells. One type of memory cell, for example, single level cells (SLCs) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 133 can include one or more arrays of memory cells such as SLCs, MLCs, TLCs, QLCS, PLCs, or any combination of such. In some embodiments, a particular memory device can include an SLC portion, an MLC portion, a TLC portion, a QLC portion, and/or a PLC portion of memory cells. The memory cells of the memory devices 133 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 133 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), spin transfer torque (STT)-MRAM, conductive bridging RAM (CBRAM), resistive random-access memory (RRAM), Oxide based RRAM (OxRAM), negative-or (NOR) flash memory, and electrically erasable programmable read-only memory (EE-PROM).

A memory sub-system controller 111 (or controller 111 for simplicity) can communicate with the memory devices 133 to perform operations such as reading data, writing data, or erasing data at the memory devices 133 and other such operations (e.g., in response to commands scheduled on a command bus by controller 121). The controller 111 can include hardware such as one or more integrated circuits (ICs) and/or discrete components, a buffer memory, or a combination thereof. The hardware can include digital circuitry with dedicated (i.e., hard-coded) logic to perform the operations described herein. The controller 111 can be a microcontroller, special-purpose logic circuitry (e.g., a field programmable gate array (FPGA), an application specific integrated circuit (ASIC), etc.), or another suitable processor.

The controller 111 can include a processing device 113 (processor) configured to execute instructions stored in a local memory 117. In the illustrated example, the local memory 117 of the controller 111 includes an embedded memory configured to store instructions for performing various processes, operations, logic flows, and routines that control operation of the memory sub-system 110, including handling communications between the memory sub-system 110 and the host system 120.

In some embodiments, the local memory 117 can include memory registers storing memory pointers, fetched data, etc. The local memory 117 can also include read-only memory (ROM) for storing micro-code. While the example memory sub-system 110 in FIG. 1 has been illustrated as including the controller 111, in another embodiment of the present disclosure, a memory sub-system 110 does not include a controller 111, and can instead rely upon external control (e.g., provided by an external host, or by a processor or controller separate from the memory sub-system).

In general, the controller 111 can receive commands or operations from the host system 120 and can convert the commands or operations into instructions or appropriate commands to achieve the desired access to the memory devices 133. The controller 111 can be responsible for other operations such as wear leveling operations, garbage collection operations, error detection and error-correcting code (ECC) operations, encryption operations, caching operations, and address translations between a logical address (e.g., logical block addressing (LBA) addresses, namespace) and a physical address (e.g., physical block address) that are associated with the memory devices 133. The controller 111 can further include host interface circuitry to communicate with the host system 120 via the physical host interface. The host interface circuitry can convert the commands received from the host system into command instructions to access the memory devices 133 as well as convert responses associated with the memory devices 133 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 111 and decode the address to access the memory devices 133.

In some embodiments, the memory devices 133 include local media controllers 135 that operate in conjunction with the memory sub-system controller 111 to execute operations on one or more memory cells of the memory devices 133. An external controller (e.g., memory sub-system controller 111) can externally manage the memory device 133 (e.g., perform media management operations on the memory device 133). In some embodiments, a memory device 133 is a managed memory device, which is a raw memory device combined with a local controller (e.g., local media controller 135) for media management within the same memory device package. An example of a managed memory device is a managed NAND (MNAND) device.

The computing system 100 includes a traffic manager configured to direct requests, configured to read data from and write data to the media of the memory sub-system 110, on separate paths according to types of applications that generate the requests in the host system 120. For example, a traffic manager 115 in the memory sub-system 110 can allocate virtual paths for the requests from applications of different types to access the memory devices 131, . . . , 133. Optionally, a traffic manager 125 in the host system 120 can be configured to schedule requests from the applications of different types for the traffic manager 115 in the memory sub-system 110, or provide information to assist the traffic manager 115 in the memory sub-system 110 in separate the requests from different types of applications. In some embodiments, the controller 111 in the memory sub-system 110 includes at least a portion of the traffic manager 115. In other embodiments, or in combination, the controller 121 and/or the processing device 123 in the host system 120 includes at least a portion of a traffic manager 125 that is configured to perform the operations in manage the access traffics of the applications running int he host system 120. For example, the controller 111, the controller 121, and/or the processing device 123 can include logic circuitry implementing operations of the traffic manager 115 and/or the traffic manager 125. For example, the controller 111, or the processing device 123 (processor) of the host system 120, can be configured to execute instructions stored in memory for performing the operations of the traffic manager 115 and/or and the traffic manager 125 described herein. In some embodiments, the traffic manager 115 is implemented in an integrated circuit chip disposed in the memory sub-system 110. In other embodiments, the traffic manager 125 is part of an operating system of the host system 120, a device driver, or an application.

Figure 2:
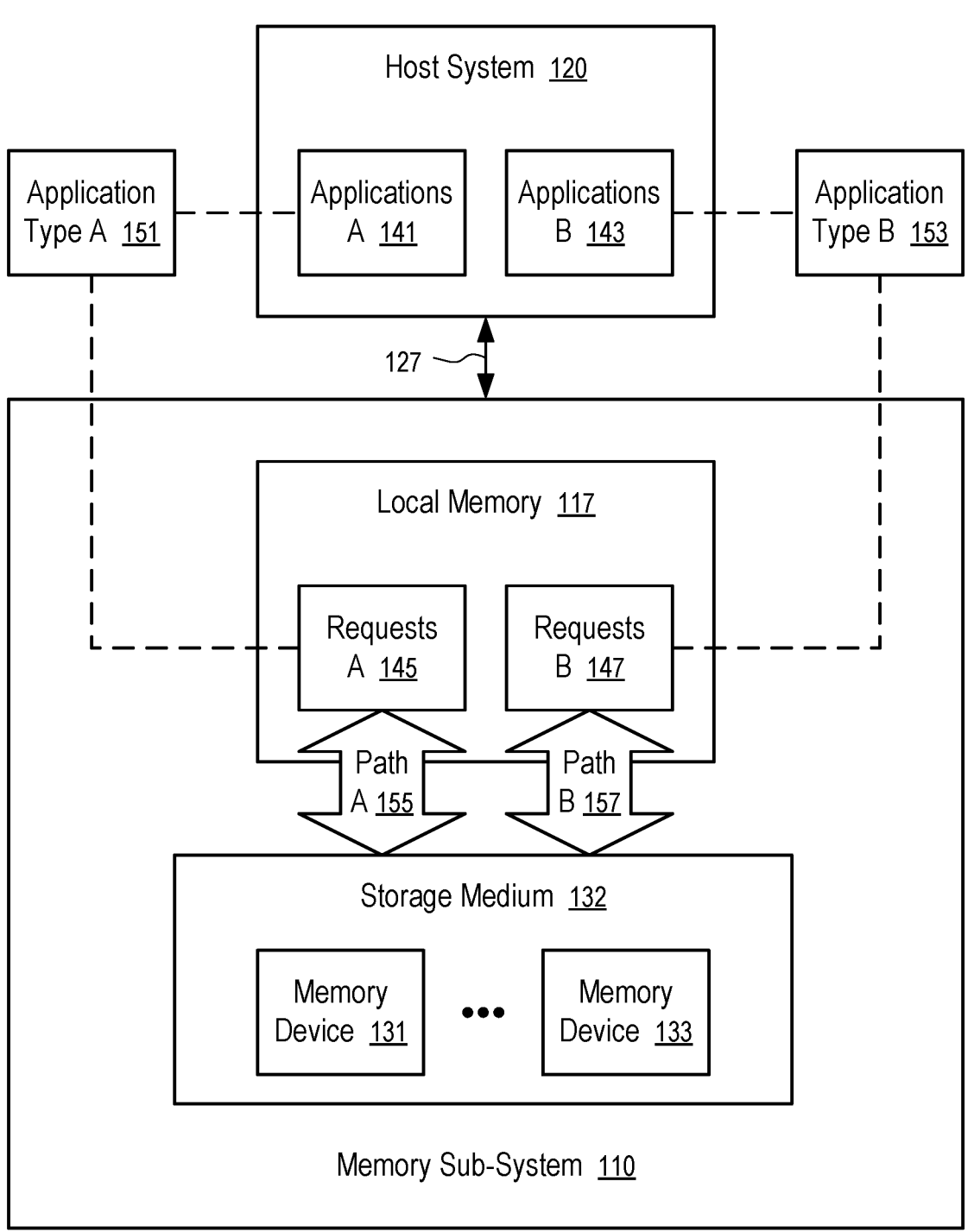
FIG. 2 shows a memory sub-system having different paths configured for storage access requests of different types of applications to access a storage medium in the memory sub-system according to one embodiment.

FIG. 2 shows a memory sub-system having different paths configured for storage access requests of different types of applications to access a storage medium in the memory sub-system according to one embodiment. For example, the technique of FIG. 2 can be implemented in the computing system 100 of FIG. 1 via the traffic managers 125 and 115.

In FIG. 2, the host system 120 can run applications (e.g., 141, 143) of different types (e.g., 151, 153).

For example, applications 141 can be of a type 151 that are throughput bound; and applications 143 can be of a type 153 that are latency bound. Thus, the applications 141 can have requirements for the memory sub-system 110 different from the requirements of applications 143.

FIG. 2 illustrates an example of classifying applications (e.g., 141, 143) into two types (e.g., 151, 153). In general, the technique can be applied to classify applications into more than two types; and each type of applications can be configured on a separate path to reach the storage medium 132 of the memory sub-system 110.

The most significant portion of the delay in processing a request from an application in the host system 120 to access the storage medium 132 (e.g., for read or write) can be in the movement of data between the local memory 117 and the storage medium 132. Thus, separate paths 155 and 157 can be allocated for the requests 145 from applications 141 of the type 151, and for the requests 147 from applications 143 of the type 153.

When a request (e.g., 145 or 147) is transmitted from host system 120 to the memory sub-system 110 (e.g., to read data from the storage medium 132, or to write data into the storage medium 132), the host system 120 can identify the type (e.g., 151 or 153) of the application (e.g., 141 or 143) that generates the request.

For example, the application type (e.g., 151 or 153) of the request (e.g., 145 or 147) can be identified by the traffic manager 125 in the host system 120 via vendor specific function pins of the memory sub-system 110 to the traffic manager 115 in the memory sub-system 110.

Optionally, a field of priority level is configured in the request (e.g., 145 or 147); and the priority level can be used to identify the application type. Alternatively, the priority level is configured to indicate the priority of the request within the requests from the applications of the same type (e.g., 151 or 153); and the priority level field has no effect over the scheduling of requests from different types of applications.

Optionally, the application types 151 and 153 can be indicated by the addresses in the requests 145 and 147. For example, the applications 141 of the type 151 can be configured to use a memory/storage region (e.g., a namespace or address segment); and the applications 143 of the type 153 can be configured to use another memory/storage region. Thus, the traffic manager 115 can identify the application types 151 and 153 based on the addresses specified in the requests 145 and 147.

For example, the traffic manager 115 in the memory sub-system 110 can allocate a buffer to queue requests 145 from the applications 141 of the type 151, and another buffer to queue requests 147 from the applications 143 of the type 153. The requests (e.g., 145 and 147) are dispatch from the queues in the local memory 117 over the separate paths 155 and 157 to the memory devices 131, . . . , 133 for execution.

In some implementations, the paths 155 and 157 can be virtual channels allocated by the traffic manager 115 over a physical connection to the storage medium 132. The bandwidths allocated to the virtual channels can be configured to maintain different performance goals for different types of the application types 151 and 153.

For example, for the requests (e.g., 145) from throughput bound applications (e.g., 141), the allocation of the path 155 can be configured to achieve at least a minimum throughput performance level. Similarly, for the requests (e.g., 147) from latency bound applications (e.g., 143), the application of the path 157 can be configured to achieve at least a minimum latency performance level.

Optionally, the allocation of the paths 155 and 157 can be configured to optimize a performance goal with a customizable weight to the throughput performance level for the requests 145 and another customizable weight to the latency performance level for the requests 147.

For example, the virtual channels can be time-shared slices of access to the physical connection. Alternatively, or in combination, the memory sub-system 110 can have multiple physical connections. Thus, a path (e.g., 155 or 157) can be a combination of time-shared slices of one or more physical connections and one or more dedicated physical connections.

Optionally, the traffic manager 125 in the host system 120 can schedule and dispatch requests 145 and 147 in a mix sequence such that when the requests are processed according to the sequence in the memory sub-system 110, the requests 145 and 147 are separated on virtual channels of time-shared slices of the usage of the physical connection(s) from the local memory 117 to the storage medium 132.

Figure 3:
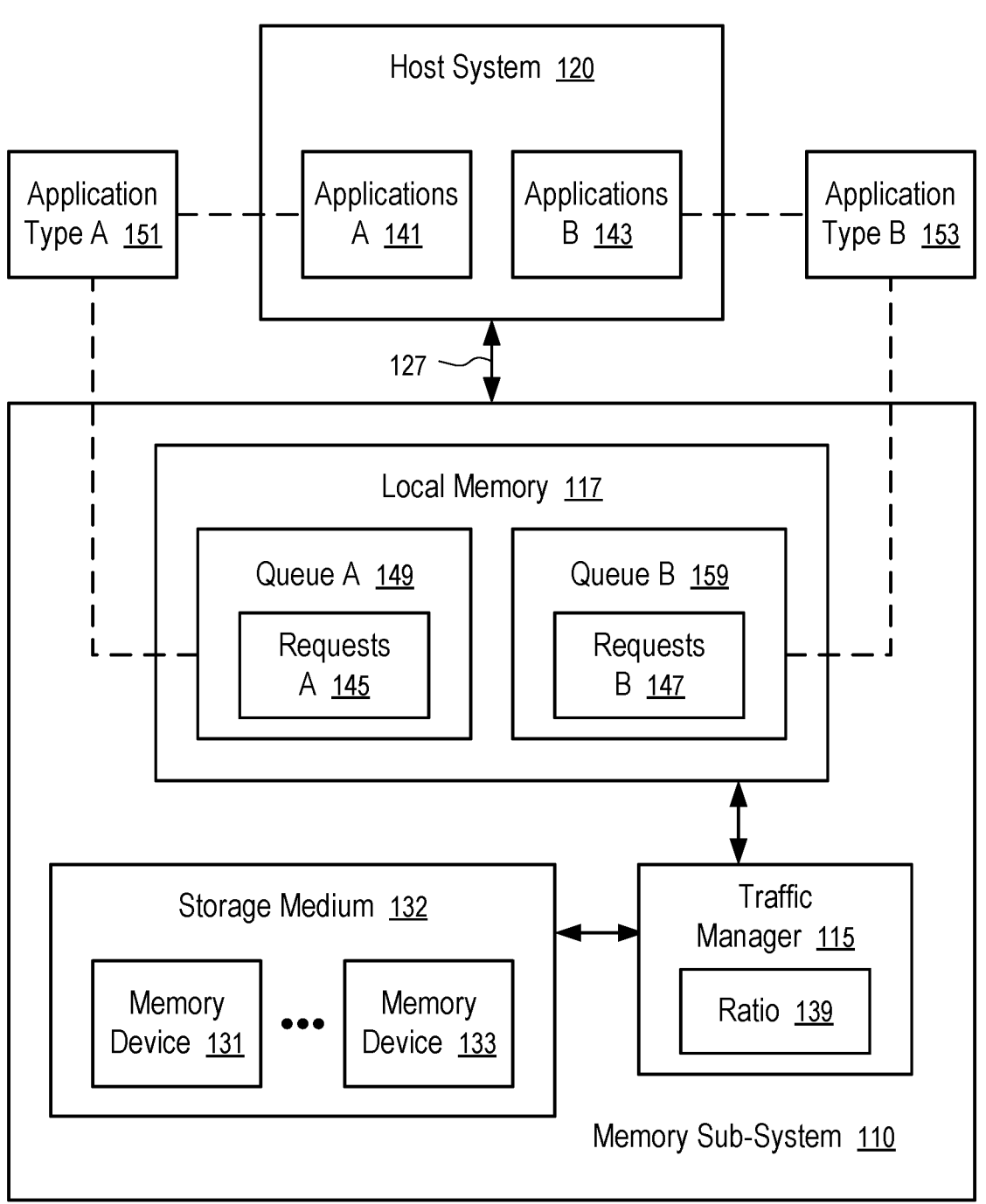
FIG. 3, FIG. 4, and FIG. 5 illustrate different implementations of path separation for different types of applications to access a storage medium in the memory sub-system according to one embodiment.
Figure 4:
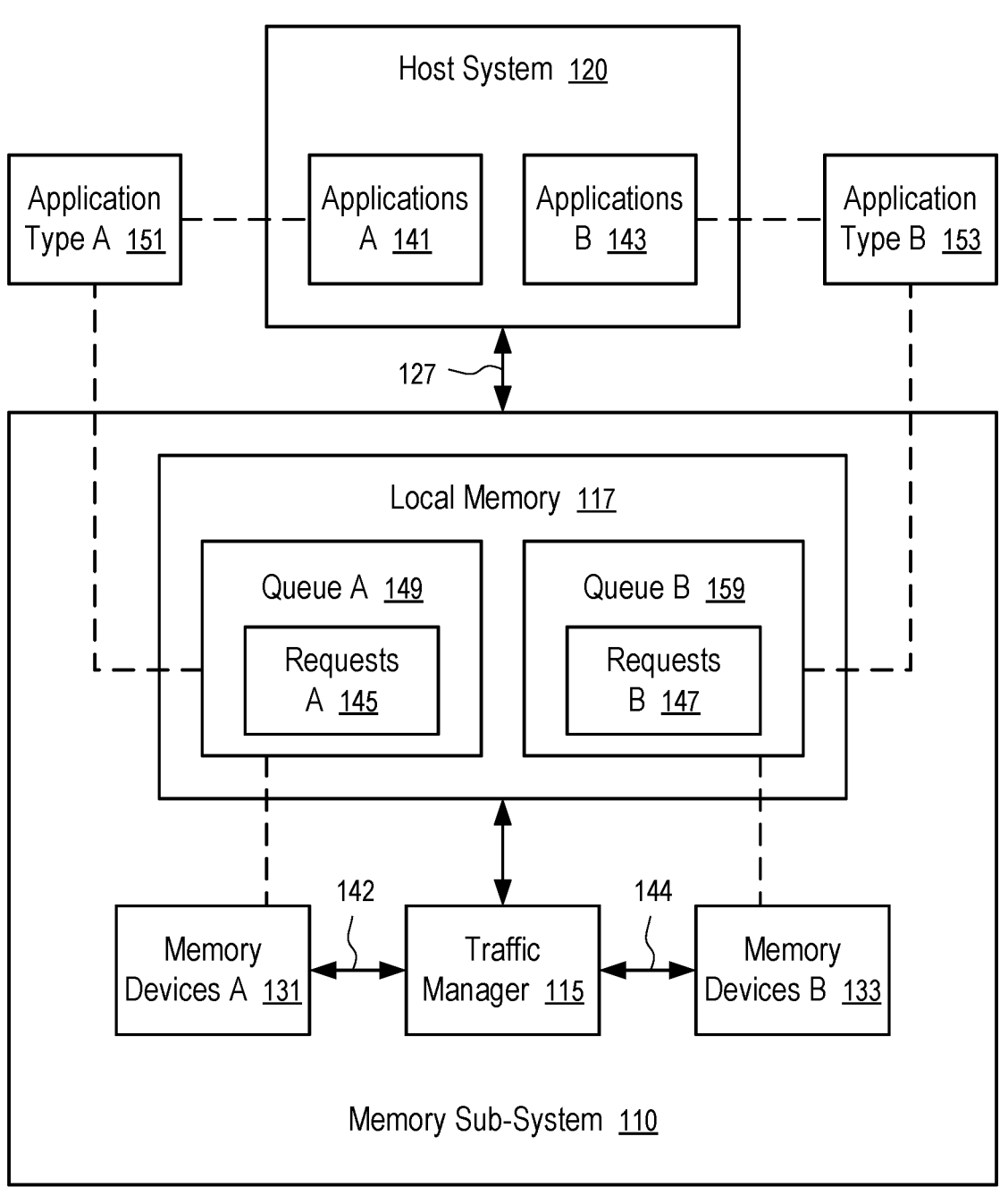
Figure 5:
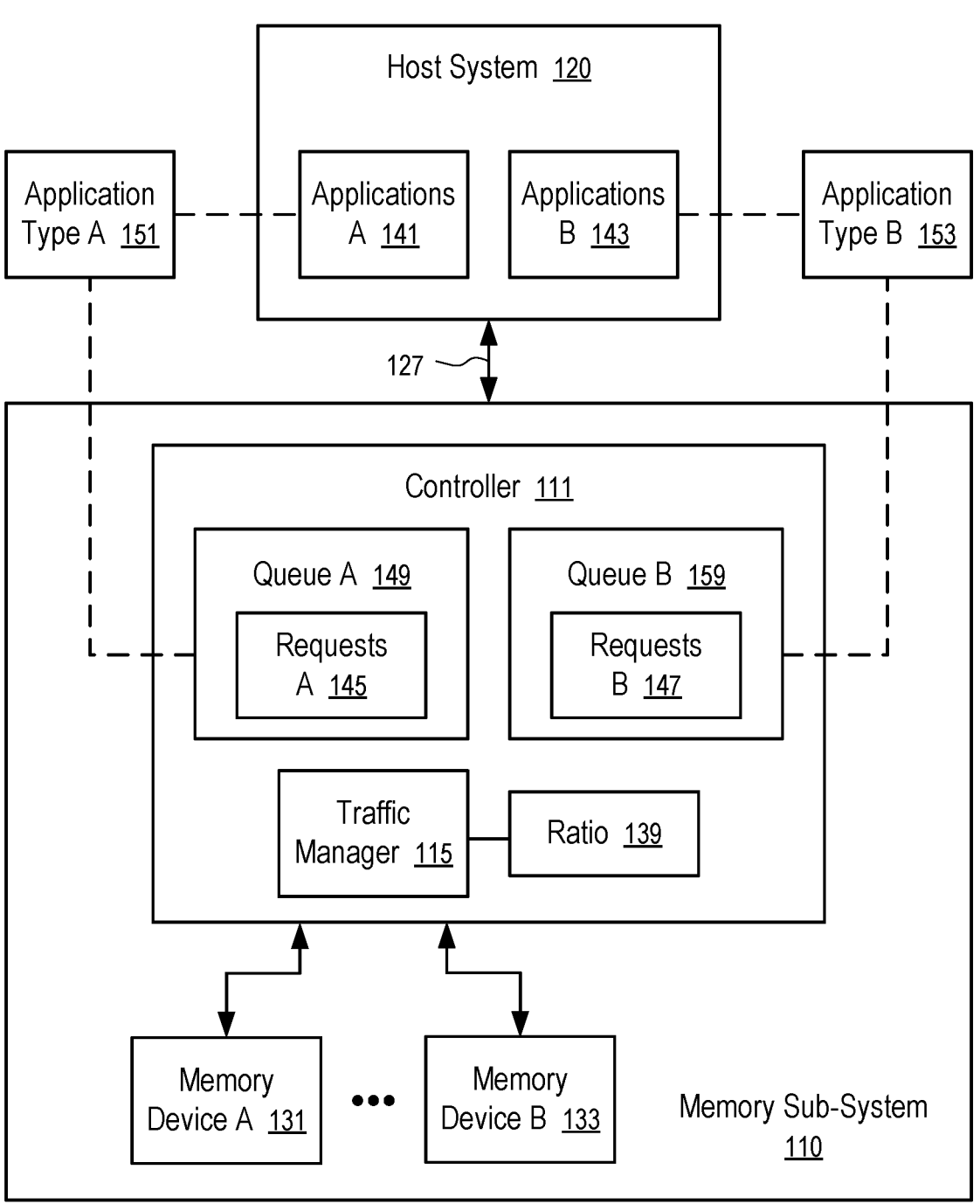

FIG. 3, FIG. 4, and FIG. 5 illustrate different implementations of path separation for different types of applications to access a storage medium in the memory sub-system according to one embodiment. For example, the paths 155 and 157 in the memory sub-system 110 can be implement using the techniques of FIG. 3, FIG. 4, and/or FIG. 5.

In FIG. 3, the memory sub-system 110 is configured with separate queues 149 and 159. One queue 149 is configured for the requests 145 from applications 141 of one type 151 (e.g., throughput bound); and another queue 159 is configured for the requests 147 from applications 143 of another type 153 (e.g., latency bound)

A traffic manager 115 is configured between the local memory 117 and the storage medium 132 to service the requests 145 and 147 from the queues 149 and 159.

The traffic manager 115 can have a configurable ratio 139 to control the servicing of the requests 145 and 147 from the queues 149 and 159. For example, when a 1:1 ratio is configured for the traffic manager 115, the traffic manager 115 can service one request from the queue 149 for each request serviced from the queue 159 and service one request from the queue 159 for each request serviced from the queue 149, if both queues 149 and 159 are not empty. Thus, the requests 145 and 147 in the queues 149 and 159 have separate virtual paths 155 and 157 through the traffic manager 115 to the storage medium 132; and the bandwidth of the virtual paths 155 and 157 are equally allocated to the queues 149 and 159 (and thus the application types 151 and 153).

An alternative ratio can be configured for the traffic manager 115 according to the performance requirements of the types 151 and 153 of applications (e.g., 141 and 143).

For example, when two successive requests 147 in the queue 159 are separated by n requests from the queue 149, the latency of servicing a request from the queue 159 can increase by an amount of time required to process the n requests from the queue 149. The ratio 139 can be adjusted to cause the increase of the number n of requests 145 serviced from the queue 149 between two successive requests 147 from the queue 159, the increase can be up to a threshold without causing the latency for servicing the requests 147 in the queues 159 to exceed a latency threshold for the applications 143 of the type 153.

On the other hand, decreasing the number n of requests 145 serviced from the queue 149 between two successive requests 147 from the queue 159 can decrease the average throughput of servicing the requests 145 from the queue 149. The decreasing can be to a threshold without causing the average throughput for servicing the requests 145 in the queues 149 to fall below a throughput threshold for the applications 141 of the type 151.

For example, in a period of time, the ratio 139 can be configured to prioritize the throughput requirement of the applications 141 of the type 151; and in another period of time, the ratio 139 can be configured to prioritize the latency requirement of the applications 143 of the type 153.

Optionally, a performance indicator can be configured as a weighted functions of the throughput performance level implemented for the queue 149 and the latency performance level implemented for the queue 159. The ratio 139 can be adjusted to optimize the performance indicator.

FIG. 3 illustrates an examples of a traffic manager 115 configured in the memory sub-system 110 scheduling the requests 145 and 147 from different types 151 and 153 of applications according to a ratio 139. Alternatively, a traffic manager 125 in the host system 120 can be configured to interleave the requests 145 and 147 according to the ratio 139 in transmitting the request 145 and 147 to the memory sub-system 110. Thus, when the memory sub-system 110 processes the interleaved requests from the host system 120 in an order according to their arrival time, the requests can reach the storage medium 132 in the ration 139 as implemented by the traffic manager 115 of FIG. 3.

In some implementations, the queues 149 and 159 share a same physical connection to reach the storage medium 132. Thus, processing more requests from one queue can decrease the performance of processing requests in another queue.

In other implementations, the memory sub-system 110 is configured with multiple physical connections to the storage medium 132. Thus, the processing of the requests 145 and 147 from the queues 149 and 159 can be performed concurrently at least in part, as in FIG. 4 and FIG. 5.

In FIG. 4, the traffic manager 115 has separate physical connections 142 and 144 to one or more memory devices 131 and one or more memory devices 133. The memory sub-system 110 can allocate memory resources in the memory devices 133 to service the memory requests 147 from the applications 143 of the type 153, and allocate memory resources in the memory devices 131 to service the memory requests 145 from the applications 141 of the type 151.

For example, in response to a request 147 to write data into the memory sub-system 110, the traffic manager 115 can determine that the request 147 is associated with the type 153 of applications (e.g., 143); and as a result, the memory sub-system 110 can map the logical address identified in the request 147 to a physical address in the memory devices 133 to optimize latency performance for the applications 143.

For example, in response to a request 145 to write data into the memory sub-system 110, the traffic manager 115 can determine that the request 145 is associated with the type 151 of applications (e.g., 141); and as a result, the memory sub-system 110 can map the logical address identified in the request 145 to a physical address in the memory devices 131 to optimize throughput of the applications 141.

In some instances, some of the requests 145 and 147 from both queues 149 and 159 are addressed to access a same group of memory devices (e.g., 131 or 133). Thus, the traffic manager 115 can use the technique of FIG. 3 to balance the performance requirements of the different types 151 and 153 of applications (e.g., 141 and 143).

In some implementations, the most significant portion of delays in completing a request (e.g., 145 or 147) is in the execution of the request in a memory device (e.g., 131 or 133). Thus, the traffic manager 115 can be configured to balance the workloads of the memory devices 131, . . . , 133 as in FIG. 5 according to a ratio 139.

In FIG. 5, the controller 111 can have multiple communication connections to send requests (e.g., 145, 147) to memory devices 131, . . . , 133 for execution. The traffic manager 115 can distribute the memory resources used by the applications 141 of the type 151 and the applications 143 of the type 153 across the memory devices 131, . . . , 133 to optimize the performance goals for the different types 151 and 153 of applications (e.g., 141, 143).

Figure 6:
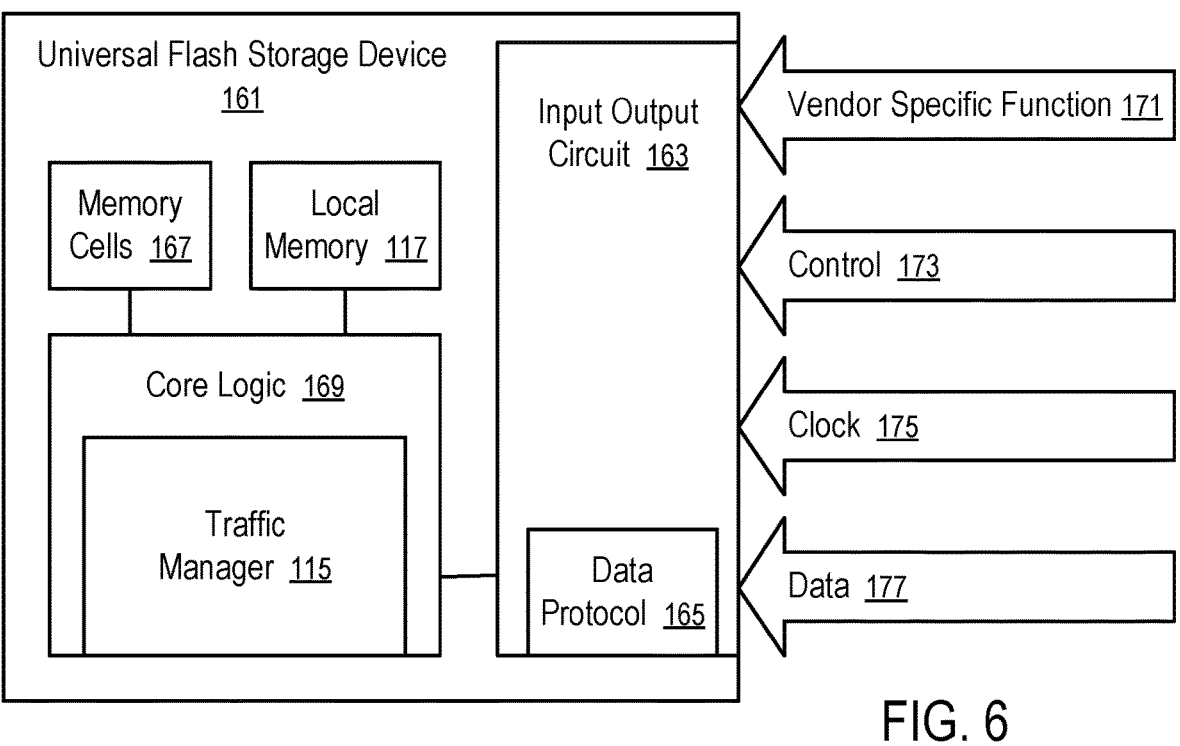
FIG. 6 and FIG. 7 show examples of universal flash storage devices having traffic managers configured according to some embodiments.
Figure 7:
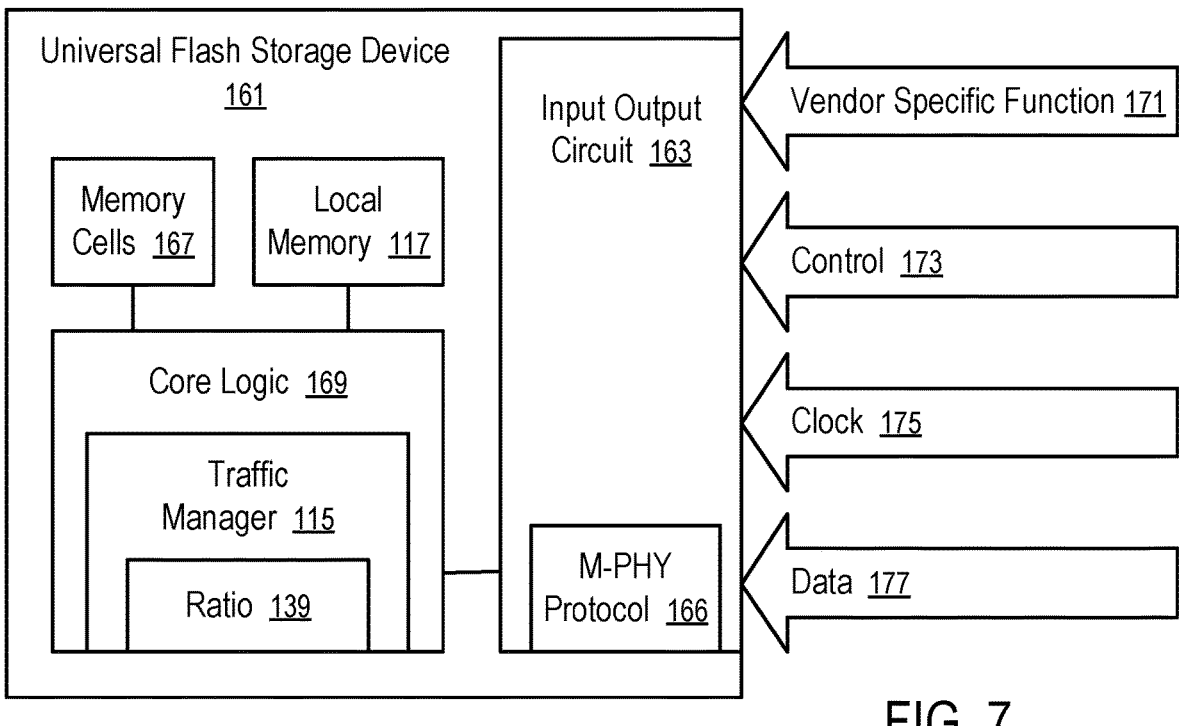

In some implementations, the memory sub-system 110 is configured as a universal flash storage (UFS) device, as in FIG. 6 and FIG. 7, FIG. 6 and FIG. 7 show examples of universal flash storage devices having traffic managers 115 configured according to some embodiments.

In FIG. 6 and FIG. 7, a universal flash storage device 161 has an input output circuit 163 configured as a host interface 119 for communication over a connection (e.g., 127) to a host system 120 (e.g., in FIG. 1 to FIG. 5).

The input output circuit 163 can include pins or contacts to signal lines, such as control 173, clock 175, data 177, and vendor specific function 171. The input output circuit 163 can implement communication protocols for the data 177, clock 175, and control 173 according to a standard for universal flash storage (UFS).

For example, the input output circuit 163 can implement a physical layer of protocol 165 for data communication over a data line. For example, the data protocol 165 can be a M-PHY protocol 166 (e.g., in FIG. 7) that allows a scalable variety of signal speeds per lane of differential signal wires.

The universal flash storage device 161 can have a core logic 169 configured as a processing device of a memory sub-system 110. A traffic manager 115 can be implemented in the core logic 169 via logic circuit and/or firmware.

The universal flash storage device 161 has a local memory 117 to queue requests 145 and 147 from different types 151 and 153 of applications (e.g., 141 and 143), as in FIG. 2 to FIG. 5. The traffic manager 115 can determine the application types 151 and 153 of the requests 145 and 147. For example, the vendor specific function 171 can be used by the host system 120 to identify the application type 151 of the requests 145 and the application type 153 of the request 147.

In some implementations, application types are identified implicitly via the addresses used by the applications 141 and 143. For example, the applications 141 can be configured to use one set of one or more namespaces; and the applications 143 can be configured to use another set of one or more namespaces. Thus, the traffic manager 115 can tell the requests 145 of the application type 151 apart from the requests 147 of the application type 153 from the addresses specified in the requests 145 and 147.

Alternatively, a priority field (or another field) in the requests 145 and 147 can be used to identify the application types (e.g., 151 and 153) of the requests 145 and 147.

The universal flash storage device 161 has memory cells 167. The traffic manager 115 in the core logic 169 can dispatch the requests 145 and 147 from the local memory 117 to access the memory cells 167.

In some implementations, the core logic 169 controls the execution of the operations to access the memory cells 167 according to the requests 145 and 147. In other operations, the memory cells 167 are configured in memory devices 131, . . . , 133 that have local media controllers (e.g., 135) that can receive the requests from the core logic 169 and execute the requests.

Optionally, the traffic manager 115 can partition the memory cells 167 for parallel access by the requests 145 and 147 of different application types 151 and 153, as in FIG. 4 and FIG. 5.

Optionally, the traffic manager 115 can be configured with a ratio 139 to interleave the processing of requests 145 and 147 of different application types 151 and 153 via shared resources (e.g., connection(s) to storage medium 132 or memory devices 131, . . . , 133), as in FIG. 3, FIG. 5, and FIG. 6.

FIG. 8 shows a method of traffic management according to one embodiment.

For example, the method of FIG. 8 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 8 is performed at least in part by the traffic manager 115 and/or the traffic manager 125 in FIG. 1 to FIG. 7. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 8 can be implemented in the computing system 100 of FIG. 1. the computing system 100 includes a memory sub-system 110 having memory cells (e.g., 167 in memory devices 131 or 133 configured on an integrated circuit die). The memory cells 167 can provide a storage capacity of the memory sub-system 110 over a host interface 119 (e.g., input output circuit 163) over a connection 127 to a host system 120. The memory sub-system 110 can have a logic circuit (e.g., processing device 113, core logic 169) configured to process read commands and write commands received from the host system 120 in the host interface 119. The memory sub-system 110 has a local memory 117 configured to buffer access requests (e.g., read commands and write commands). The logic circuit can be configured to separate requests received via the host interface 119 into a first queue 149 in the local memory 117 and a second queue 159 in the local memory 117 according to types (e.g., 151 and 153) of applications (e.g., 141 and 143) that generate the requests (e.g., 145 and 147) in the host system 120.

For example, the logic circuit can be configured via a ratio 139 to interleave processing of requests from the first queue and the second queue in access the memory cells 167 of the memory sub-system 110.

For example, the logic circuit is configured to allocate resources (e.g., memory devices 131, . . . , 133, bandwidth to access the memory devices 131, . . . , 133) to the first queue and the second queue according to the different requirements of the different types 151 and 153 of applications 141 and 143. For example, a throughput requirement can be implemented for the first type 151 of applications 141; and a latency requirement can be implemented for the second type 153 of applications 143.

For example, the memory sub-system 110 can be a universal flash storage (UFS) device 161; and the host interface 119 includes an input output circuit 163 configured to perform communications with a host system 120 according to a specification for universal flash storage (UFS). For example, the data communications in the input output circuit 163 can be in accordance with an M-PHY protocol 166.

At block 201, the method includes receiving, in a memory sub-system 110 and from a host system 120, a plurality of requests (e.g., 145 and 147) to access a storage medium 132 of the memory sub-system 110.

At block 203, the method includes identifying, by the memory sub-system 110 based on a first type 151 of applications 141 running in the host system 120, first requests 145 among the plurality of requests.

For example, the first type 151 of applications 141 can be throughput bound.

For example, applications 141 of the first type 151 have a throughput requirement for the memory sub-system 110 in processing a batch of requests to access the storage medium 132.

At block 205, the method includes queuing, by the memory sub-system 110, the first request 145 in a first queue 149.

At block 207, the method includes identifying, by the memory sub-system 110 based on a second type 153 of applications 143 running in the host system 120, second requests 147 among the plurality of requests.

For example, the second type 153 of applications 143 are latency bound.

For example, applications 143 of the second type 153 have a latency requirement for the memory sub-system 110 in processing individual requests to access the storage medium 132.

At block 209, the method includes queuing, by the memory sub-system 110, the second request 147 in a second queue 159.

At block 211, the method includes scheduling, by the memory sub-system 110, the servicing of requests (e.g., 145) retrieved from the first queue 149 between the servicing of successive requests (e.g., 147) retrieved from the second queue 159.

For example, the method can further include: configuring, by the memory sub-system 110, a ratio 139 between requests serviced from the first queue 149 and requests serviced from the second queue 159 to at least meet a latency performance requirement of applications 143 of the second type 153.

For example, the method can further include: configuring, by the memory sub-system 110, a ratio 139 between requests serviced from the first queue 149 and requests serviced from the second queue 159 to at least meet a throughput performance requirement of applications 141 of the first type 151.

For example, the method can further include: configuring, by the memory sub-system 110, a ratio 139 between requests serviced from the first queue 149 and requests serviced from the second queue 159 according to optimization of a combined performance level that is a function of a throughput performance level for applications 141 of the first type 151 and a latency performance level for applications 143 of the second type 153.

For example, the method can include: receiving, in the memory sub-system 110, a typical request to access the storage medium; and receiving, from the host system 120 in connection with the receiving of the typical request, an identification of a type of an application that generates the request. The type can be the first type 151, or the second type 153. For example, the receiving of the identification is via a pin for vendor specific function (VSF) 171.

For example, the identifying of the first requests 145 can be based on addresses in the first requests 145 being pre-associated with the first type 151; and the identifying of the second requests can be based on addresses in the second requests 147 being pre-associated with the second type 153.

For example, the identifying of the first requests 145 can include: extracting data from a predetermined field in each of the first requests 145; and determining that the data is pre-configured to represent the first type 151. For example, the predetermined field can be field configured to specify an address to be accessed via a request, or a priority level of the request.

In some implementations, the operations of identifying requests from different types (e.g., 151 and 153) of requests (e.g., 145 and 147) can be implemented via a traffic manager 125 running in the host system 120. The traffic manager 125 can separate the requests into different queues and schedule the dispatching of the requests to the memory sub-system 110 according to a first performance requirement (e.g., a throughput requirement) of the first type 151 of applications 141 and a second performance requirement (e.g., latency requirement) of the second type 153 of applications 143. The scheduling can be configured to interleave the first requests (e.g., 145) and the second requests (e.g., 147) for processing by the memory sub-system 110. Alternatively, the path separation can be implemented via the traffic manager 115 running in the memory sub-system 110 for dispatching the requests for processing by memory devices 131, . . . , 133 of the memory sub-system 110.

Figure 9:
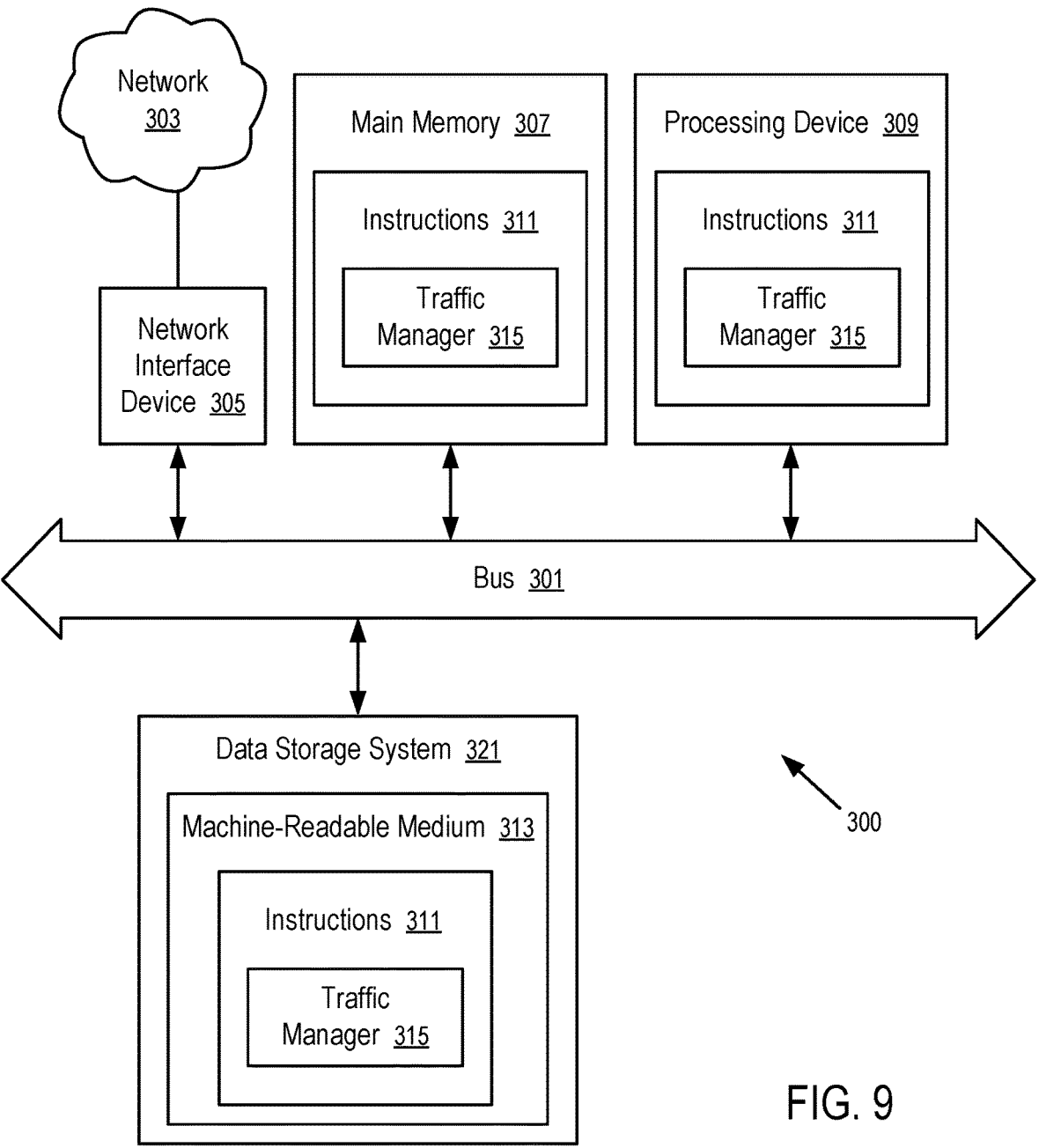
FIG. 9 is a block diagram of an example computer system in which embodiments of the present disclosure can operate.

FIG. 9 is a block diagram of an example computer system in which embodiments of the present disclosure can operate.

FIG. 9 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1) that includes, is coupled to, or utilizes a memory sub-system (e.g., the memory sub-system 110 of FIG. 1) or can be used to perform the operations of a traffic manager 315 (e.g., to execute instructions to perform operations corresponding to the traffic manager 115 and/or the traffic manager 125 described with reference to FIGS. 1-9). In alternative embodiments, the machine can be connected (e.g., networked) to other machines in a LAN, an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 309, a main memory 307 (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system 321, which communicate with each other via a bus 301 (which can include multiple buses).

Processing device 309 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 309 can also be one or more special-purpose processing devices such as an application specific integrated circuit (ASIC), a field programmable gate array (FPGA), a digital signal processor (DSP), network processor, or the like. The processing device 309 is configured to execute instructions 311 for performing the operations and steps discussed herein. The computer system 300 can further include a network interface device 305 to communicate over the network 303.

The data storage system 321 can include a machine-readable medium 313 (also known as a computer-readable medium) on which is stored one or more sets of instructions 311 or software embodying any one or more of the methodologies or functions described herein. The instructions 311 can also reside, completely or at least partially, within the main memory 307 and/or within the processing device 309 during execution thereof by the computer system 300, the main memory 307 and the processing device 309 also constituting machine-readable storage media. The machine-readable medium 313, data storage system 321, and/or main memory 307 can correspond to the memory sub-system 110 of FIG. 1.

In one embodiment, the instructions 311 include instructions to implement functionality corresponding to a traffic manager 315 (e.g., the traffic manager 115 and/or the traffic manager 125 described with reference to FIGS. 1-9). While the machine-readable medium 313 is shown in an example embodiment to be a single medium, the term "machine-readable medium" should be taken to include a single medium or multiple media that store the one or more sets of instructions. The term "machine-readable medium" shall also be taken to include any medium that is capable of storing or encoding a set of instructions for execution by the machine and that cause the machine to perform any one or more of the methodologies of the present disclosure. The term "machine-readable medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory devices, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

receiving, in a memory sub-system and from a host system, a plurality of requests to access a storage medium of the memory sub-system;

identifying, by the memory sub-system based on a first type of applications running in the host system, first requests among the plurality of requests;

queuing, by the memory sub-system, the first request in a first queue;

identifying, by the memory sub-system based on a second type of applications running in the host system, second requests among the plurality of requests;

queuing, by the memory sub-system, the second request in a second queue;

scheduling, by the memory sub-system, servicing requests retrieved from the first queue between servicing successive requests retrieved from the second queue; and configuring, by the memory sub-system, a ratio between requests.

2. The method of claim 1, wherein the first type of applications are throughput bound; and the second type of applications are latency bound.

3. The method of claim 1, wherein applications of the first type have a throughput requirement for the memory sub-system; and applications of the second type have a latency requirement.

4. The method of claim 1 wherein the configuring, by the memory sub-system, of the ratio between requests, further comprises configuring of the ratio between requests serviced from the first queue and requests serviced from the second queue to at least meet a latency performance requirement of applications of the second type.

5. The method of claim 1, further comprising:

configuring, by the memory sub-system, a ratio between requests serviced from the first queue and requests serviced from the second queue to at least meet a throughput performance requirement of applications of the first type.

6. The method of claim 1, further comprising:

configuring, by the memory sub-system, a ratio between requests serviced from the first queue and requests serviced from the second queue according to optimization of a combined performance level that is a function of a throughput performance level for applications of the first type and a latency performance level for applications of the second type.

7. The method of claim 1, further comprising:

receiving, in the memory sub-system, a request to access the storage medium; and receiving, from the host system in connection with the receiving of the request, an identification of a type of an application that generates the request, wherein the type is one of the first type and the second type.

8. The method of claim 7, wherein the receiving of the identification is via a pin for vendor specific function (VSF).

9. The method of claim 1, wherein the identifying of the first requests is based on addresses in the first requests being pre-associated with the first type; and the identifying of the second requests is based on addresses in the second requests being pre-associated with the second type.

10. The method of claim 1, wherein the identifying of the first requests includes:

extracting data from a predetermined field in each of the first requests; and determining that the data is pre-configured to represent the first type.

11. An apparatus, comprising:

a memory sub-system having:

memory cells configured to provide a storage capacity of the memory sub-system;

a host interface operable to receive requests to access the memory cells from a host system;

a logic circuit; and a local memory;

wherein the logic circuit is configured to separate the requests into a first queue in the local memory and a second queue in the local memory according to types of applications in the host system;

wherein the memory sub-system further comprises a pin for vendor specific function (VSF).

12. The apparatus of claim 11, and the pin is configured to receive an indication of a type of an application from which a request to access the memory cells is transmitted to the memory sub-system.

13. The apparatus of claim 12, wherein the types include a first type of throughput bound applications and a second type of latency bound applications.

14. The apparatus of claim 13, wherein the memory sub-system includes a universal flash storage (UFS) device; and the host interface includes an input output circuit configured to perform data communications according to an M-PHY protocol.

15. The apparatus of claim 14, wherein the logic circuit is configured according to a ratio to interleave requests from the first queue and the second queue to access the memory cells.

16. The apparatus of claim 14, wherein the logic circuit is configured to allocate resources to the first queue and the second queue according to a throughput requirement specified for the first type of applications and a latency requirement specified for the second type of applications.

17. A non-transitory computer storage medium storing instructions which, when executed in a computing system having a host system connected to a memory sub-system, causes the computing system to perform a method, the method comprising:

identifying first requests generated by applications of a first type to access a storage capacity of the memory sub-system;

identifying second requests generated by applications of a second type to access the storage capacity of the memory sub-system; and scheduling, according to a first performance requirement of the first type of applications and a second performance requirement of the second type of applications, interleaving of the first requests and the second requests for processing;

wherein the first performance requirement is based on throughput in accessing the storage capacity.

18. The non-transitory computer storage medium of claim 17, wherein the second performance requirement is based on latency in accessing the storage capacity.

19. The non-transitory computer storage medium of claim 18, wherein the method further comprises:

transmitting, from the host system to the memory sub-system, respective requests to access the storage capacity with indications of types of applications generated the respective requests.

20. The non-transitory computer storage medium of claim 19, wherein the method further comprises:

queuing the first requests in a first queue pre-associated with the first type; and queuing the second requests in a second queue pre-associated with the second type.

* * * * *